Nov. 2, 1943.　　J. H. MANSFIELD　　2,333,542
DOUBLE-END TENONER
Filed May 5, 1941　　5 Sheets-Sheet 1

INVENTOR.
Judson H. Mansfield

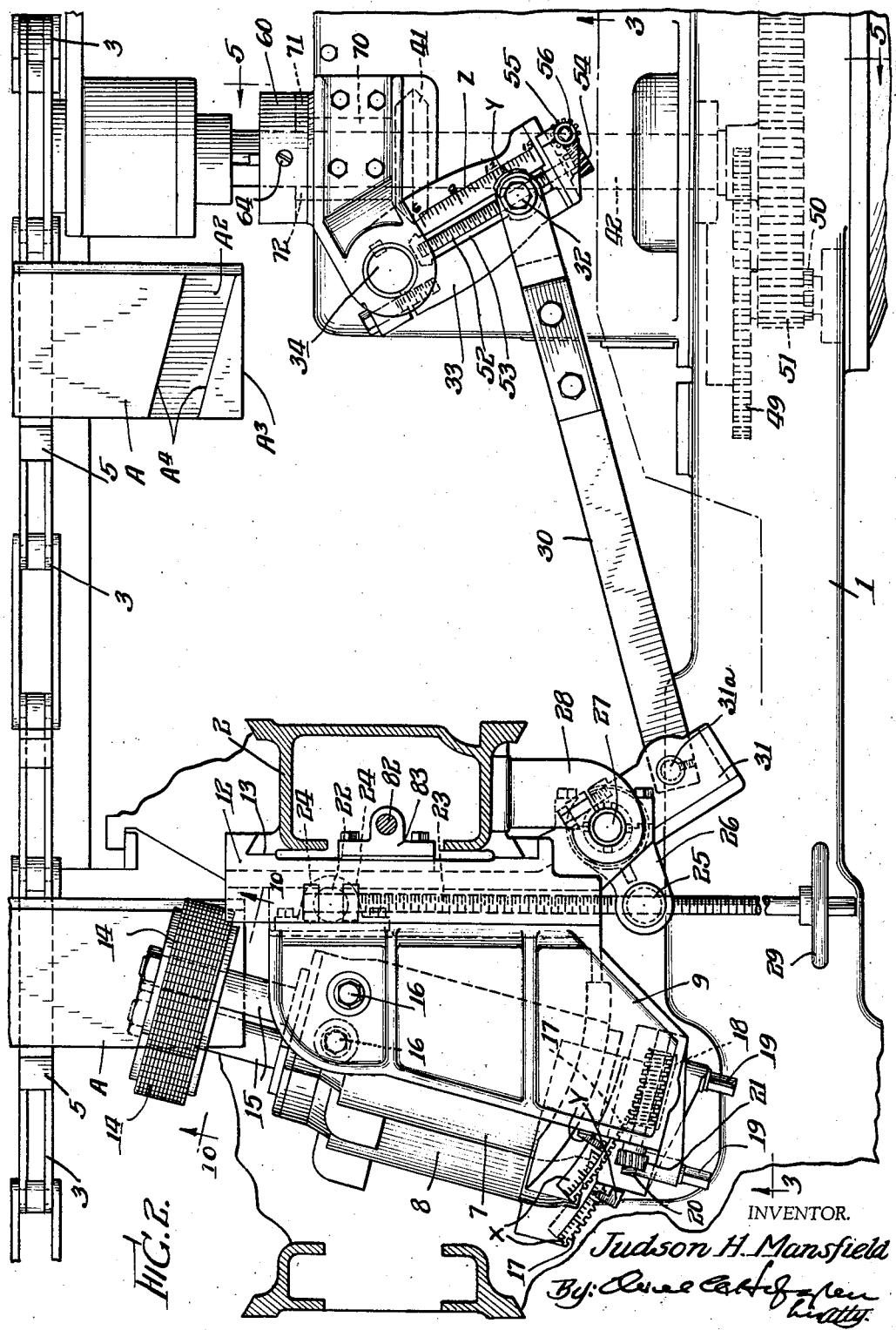

Nov. 2, 1943. J. H. MANSFIELD 2,333,542
DOUBLE-END TENONER
Filed May 5, 1941 5 Sheets-Sheet 3
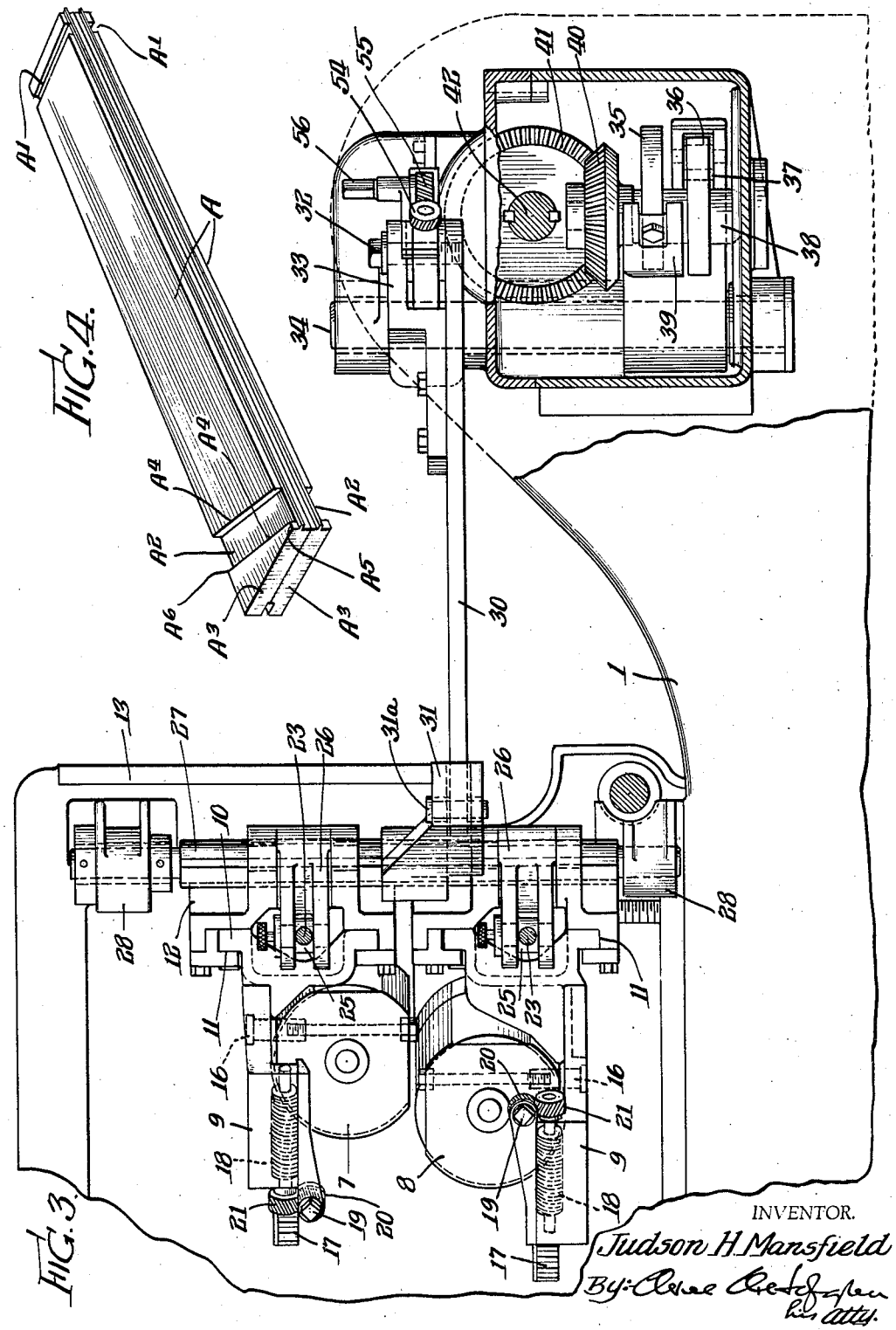
INVENTOR.
Judson H Mansfield Nov. 2, 1943. J. H. MANSFIELD 2,333,542
DOUBLE-END TENONER
Filed May 5, 1941 5 Sheets-Sheet 4
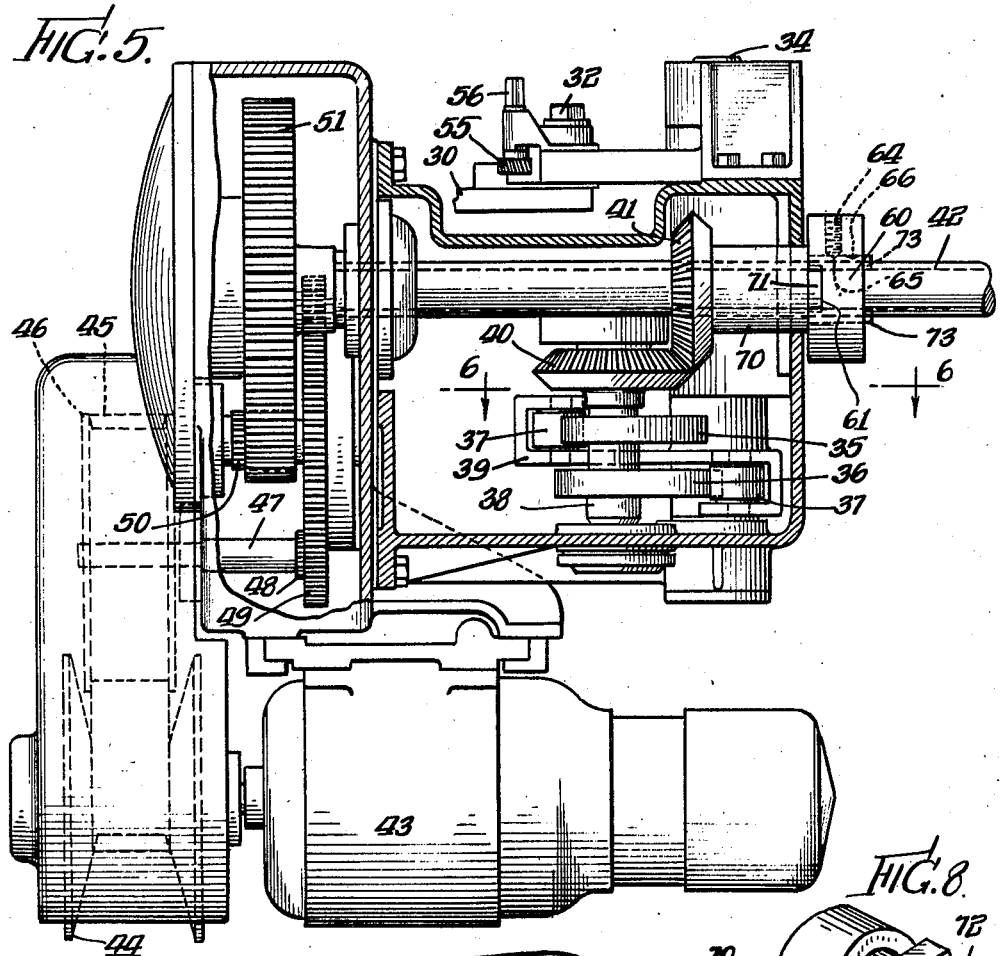
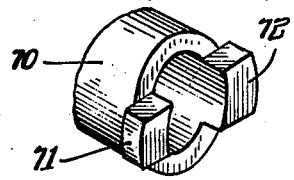
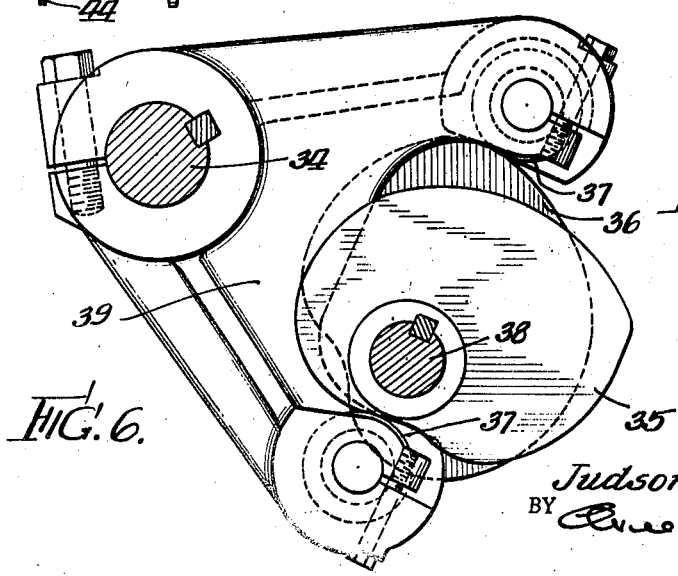
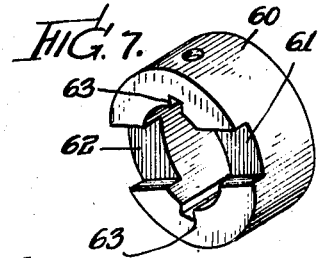
INVENTOR.
Judson H. Mansfield
BY
his atty.

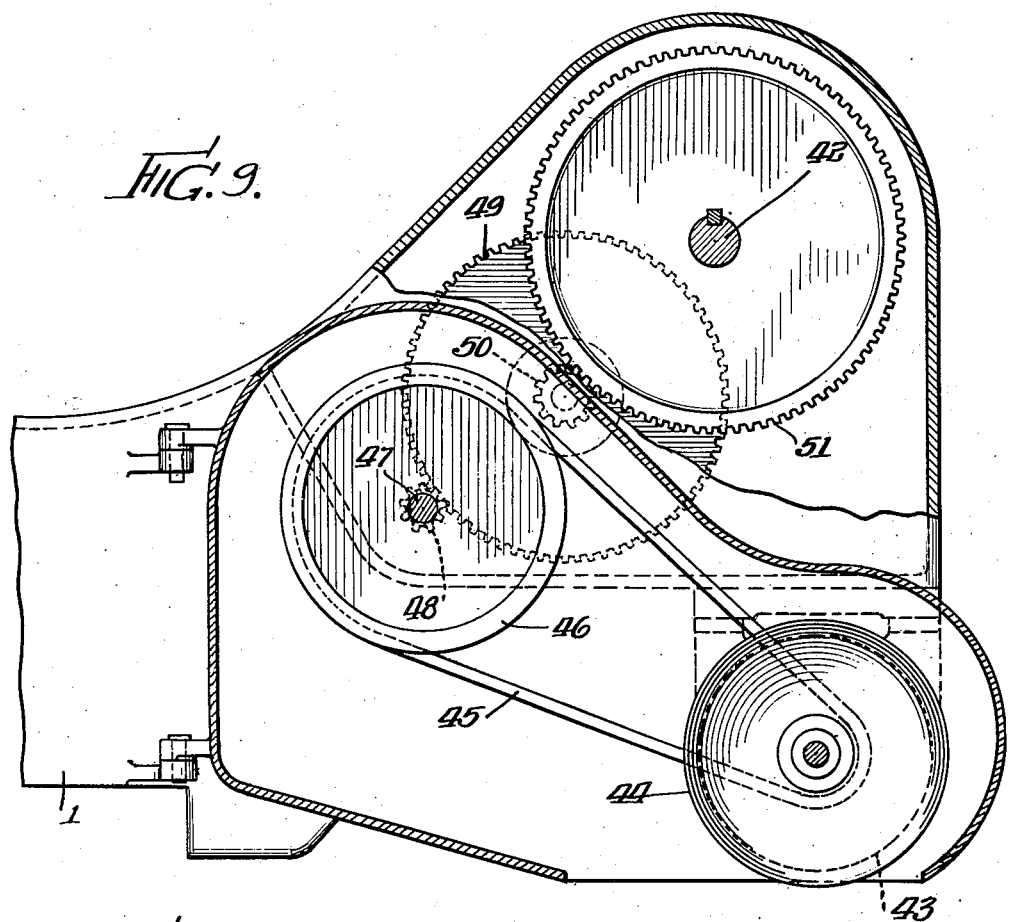
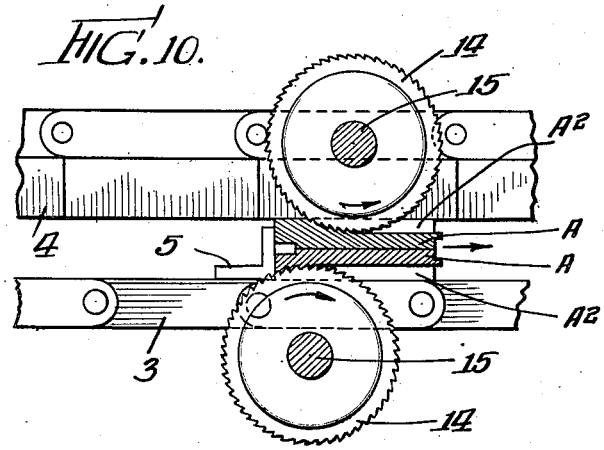

Patented Nov. 2, 1943

2,333,542

UNITED STATES PATENT OFFICE 2,333,542

DOUBLE-END TENONER

Judson H. Mansfield, Rockford, Ill., assignor to Greenlee Bros. Co., Rockford, Ill., a corporation of Illinois Application May 5, 1941, Serial No. 391,849

13 Claims. (Cl. 144—203)

This invention relates to an electrically driven double-end tenoner of a type suitable for use in general wood working shops and adapted for a variety of work, including end shaping, cutting corner joints for drawers, chests and similar cabinet work, and squaring and rabbeting door and window frames and the like. The machine is of the same general type as that shown in Patent No. 1,711,275, issued April 30, 1929, but involves certain novel features whereby it is adapted to produce work of a special character.

One object of the invention is to provide a machine of this class adapted to perform grooving and rabbeting at an angle to the direction of feed of the material through the machine.

Another object is to provide a machine having a rotary cutter revolving on an axis oblique to the direction of travel of the work through the machine, together with means for moving the cutter transversely of the movement of the work and in synchronized relation to the feed, to produce an obliquely directed cut.

It is also an object to provide a machine with a rotary cutter arranged with its arbor mounted for rotation on an axis oblique to the travel of the work through the machine, together with mechanism connected for moving the cutter and its arbor transversely of the direction of movement of the work and in synchronized relation thereto, and with means for changing the angle of the cutter to the direction of travel and correspondingly varying the range of its movement transversely of that direction so as to produce an obliquely directed straight cut in the work.

More specifically, it is an object of the invention to provide a machine having a rotary cutter revolving on an axis oblique to the direction of travel of the work and provided with adjusting means for varying the angle of the cutter to the work and with a graduated scale to indicate the angle of adjustment, together with adjustable means for causing the proper relative transverse movement of the work and cutter in timed relation to the feed of the work to produce an obliquely directed cut at the same angle as that at which the cutter is set, and a second scale graduated to indicate the correct adjustments of said means corresponding to the several angular adjustments of the cutter.

Further objects and advantages of the invention will become apparent from the following description taken in connection with the accompanying drawings in which:

Figure 2 is a detail plan view of the linkage by which reciprocatory motion is transmitted to the cutter heads with the cutter driving motors which they carry, for moving the cutters bodily in a direction transverse to the feed of the work through the machine.

Figure 3 is also a detail view, being a side elevation partly in section, as indicated at line 3—3 on Figure 2.

Figure 4 is a perspective view showing a pair of window frame members of the character which the machine is designed to produce.

Figure 5 is a rear elevation partly in section, as indicated at line 5—5 on Figure 2, for showing the drive connection through which power is supplied for operating the linkage of Figure 2.

Figure 6 is a detail plan section taken as indicated at line 6—6 on Figure 5, showing the operating cams for the linkage.

Figure 7 is a detail perspective view of a clutch member.

Figure 8 is a fragmentary perspective view of the mating portion of the clutch.

Figure 9 is a somewhat diagrammatic vertical sectional view to show the driving train for the machine.

Figure 10 is a diagrammatic vertical section showing the work progressing through the machine with the cutters operating thereon.

Figure 1:
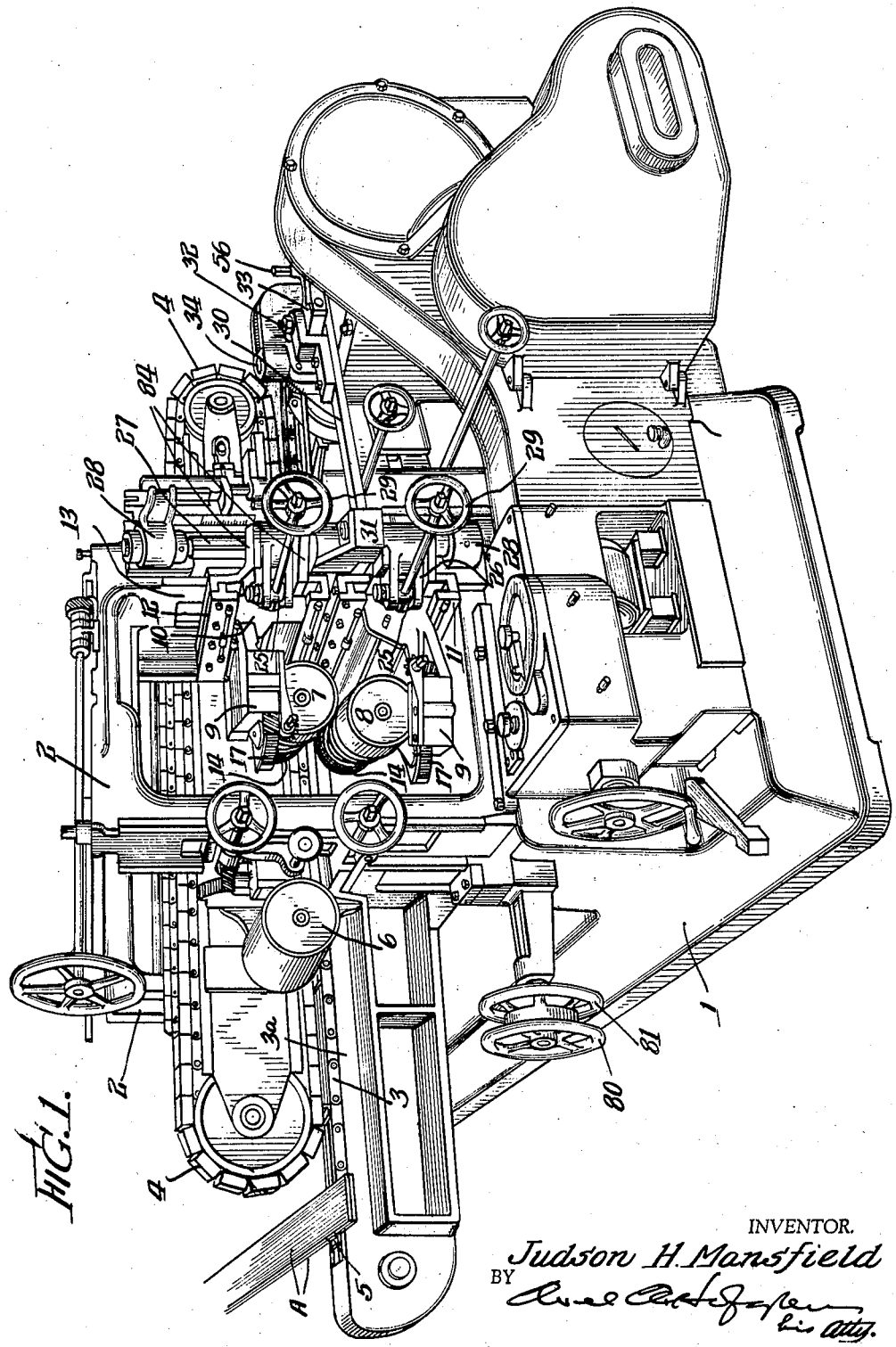
Figure 1 is a perspective view of a portion of a machine embodying this invention as seen from one side, the view including the feed chains at said side of the machine but omitting structure at the far side of the machine.

While I have shown in the drawings and shall herein describe in detail a preferred form of my invention, it is to be understood that I do not intend to limit the invention to the specific form or application disclosed, but aim to cover all modifications and alternative constructions falling within the scope of the claims.

One type of work for which this machine is particularly adapted is illustrated in Figure 4 which shows a pair of stiles A, A for a window frame. Each stile is formed with a groove $A^1$ extending across it at right angles to the longitudinal edge of the member, and a somewhat wider groove $A^2$ which is inclined at a suitable angle to support an outside sill in the completed frame. The two stiles A, A are shown placed back to back, which is the position in which they are carried through the machine for the formation of the grooves $A^1$ and $A^2$, and the special features of the machine to which this invention is directed are those related to the cutting of the grooves $A^2$.

As shown in Figure 1, the machine includes a base 1 upon which there is supported a pair of substantially rectangular upright standards 2, 2 spaced apart to provide room between them for the work feeding means. This includes a pair of feed chains 3, only one of which is shown in Figure 1, and a pair of rubber-padded hold-down chains 4, of which only one is shown in Figure 1. The chains 3, traveling overhorizontally extending ways $3^a$, constitute a feed bed upon which the work-pieces, such as the members A, A, are supported and advanced, and as they move through the machine the pieces A, A are maintained in position on the chains 3 by the chains 4 which travel at the same speed. Suitable angle lugs 5 are secured to the feed chains 3 at intervals to provide driving engagement with the work A. It may be understood that each of the standards 2 will support suitable rotary cutters each provided with its individual driving motor; Figure 1 shows the motor 6, the shaft of which serves as an arbor for one such cutter which operates to square the ends $A^3$ of the work-pieces A; and at 7 and 8 there may be seen the driving motors having shafts which constitute the arbors for cutters which form the grooves $A^2$ in the work-pieces. Each of the motors 7 and 8 is supported by a bracket 9 projecting from a slide 10 which is adjustable transversely of the machine in suitable guideways 11, and these guideways are, in turn, formed on heads 12 which are vertically adjustable on the face 13 of the standard 2. The means for effecting such vertical adjustment is not shown in detail, as it is not a part of the present invention, but it may be understood that such means will serve to raise or lower the cutters 14 driven by the motors 7 and 8 so as to determine the depth of the grooves $A^2$ to be formed thereby.

As indicated in Figure 2, the cutters 14 may be composed of groups of toothed disks in the nature of circular saws secured to the shafts or arbors 15 of the motors 7 and 8, and said shafts 15 are set parallel to each other but in oblique relation to the direction of straight-line travel of the feed chains 3 so that the cutter disks 14 stand in planes parallel to the sides $A^4$ of the grooves $A^2$. Each of the motors 7 and 8 is secured to its supporting bracket 9 by a pivot 16, and is provided with a gear segment 17 meshing with a worm 18 which is journaled in the bracket 9; thus the rotation of the worm serves to adjust the motor about its pivot 16 for setting the cutters 14 at the desired angle. Such adjustment is effected by applying a suitable wrench or handle to a squared shaft 19 having a spiral gear 20 which meshes with a spiral gear 21 on the shaft of the worm 18.

Since the cutters 14 rotate in planes oblique to the direction of travel of the chains 3 and the work-pieces A carried thereby, and since the effective width of each cutter 14 is the same as the width of the grooves $A^2$ to be formed thereby, it is necessary that either the work-piece A or the cutter 14 be moved transversely of the direction of travel of the work as the cutting action proceeds in order that the oblique groove may be formed as desired. In other words, if, for example (referring to Figure 4), the leading corner $A^5$ of the groove $A^2$ is one-half inch nearer to the squared end $A^3$ than the trailing corner $A^6$ of the groove, then, during the cutting operation, as the work is fed forward through the machine by the chains 3, a simultaneous cross-feed of one-half inch must be accomplished.

In the present construction the cross-feed is applied to the cutters 14 by movement of the supporting brackets 9 and their slides 10 in the guideways 11. Each of the slides 10 carries a pivot 22 through which there extends a rod or link 23 provided with suitable shoulders or collars 24 engaging opposite sides of the pivot 22. The rod 23 is threaded for adjustable engagement in a transversely threaded pivot or wrist pin 25 which is carried in a bifurcated crank arm 26 splined to a vertical rock shaft 27 journaled in bearings 28 secured to the outer face of the upright standard 2. The splined connection between the shaft 27 and the crank arms 26 permits the vertical adjustment of the heads 12 for varying the cutting depth as already mentioned. By means of a hand wheel 29 on the threaded link rod 23 the rod may be rotatably adjusted through the wrist pin 25 to determine the exact position of the slide 10 to which it is connected by the pivot 22 for properly locating the cutter 14 and its motor which the slide supports.

Thus by swinging the rock shaft 27 and its crank arms 26 through a limited angle as the work-piece A is progressing past the cutter 14, the cutter may be shifted transversely of the direction of travel of the work-piece by exactly the amount which corresponds to the obliquity of the groove $A^2$. This swinging movement of the rock shaft 27 is transmitted to the shaft by a link 30 having one end connected by a pin $31^a$ to a crank arm 31 on the shaft 27, and having its opposite end connected by a pivot 32 to a crank arm 33 on a vertical shaft 34 (all of which is shown in Figure 2). The shaft 34 is actuated by a pair of cams 35 and 36 (see Figure 6) engaging follower rollers 37 disposed at opposite sides of the axis of the cam shaft 38 and mounted in the follower arm 39 keyed to the shaft 34. The cam shaft 38, as seen in Figure 5, is driven by means of a miter gear 40 on said shaft 38 meshing with a miter gear 41 on a horizontal shaft 42 which extends across the machine and also serves to drive the feed chains 3. Thus the motion transmitted through the cam shaft 38 and its follower shaft 34 to the rock shaft 27 by means of link 30, and resulting in the transverse movement or cross-feed of the cutters 14, is positively timed in relation to the advance of the work-piece A as it is carried along by the chains 3.

Figures 5 and 9 show the driving motor 43 connected by a variable speed pulley 44 and belt 45 to a pulley 46 on a shaft 47. The shaft 47 carries a pinion 48 meshing with a gear 49, and said gear, in turn, carries a pinion 50 meshing with a gear 51 on the shaft 42, thus providing a suitable speed-reducing train for operating the feed mechanism of the machine.

To vary the amount of movement transmitted to the link rod 23 for shifting the slide 10 and the cutter 14 transversely, the radial distance of the pivot 32 from the axis of the shaft 34 is made adjustable. The pivot is formed with a transverse threaded bore which engages an adjusting screw 52 extending radially in the crank arm 33, and the arm is formed with a guide slot 53 in which the pivot member 32 is slidably secured. A twist gear 54 on the end of the screw 52 meshes with a twist gear 55 which is provided with a squared spindle 56 for the application of a suitable wrench or handle in effecting the adjustment. Thus while the rock shaft 34 and its arm 33 always swing through the same angle, the travel of the link 30 will depend upon the radial distance at which it is connected to the arm 33, and the amount of movement which it transmits to the crank arm 31 and its rock shaft 27 may thus be varied, as desired. It will be understood that any change in the position of the pivot 32 is accompanied by a suitable adjustment of the cutter driving motors about their pivots 16 so that the angular position of the cutters 14 shall correspond to the amount of cross-feed provided by the adjustment of the driving pivot 32. In order that these adjustments shall correspond accurately, the angular position of each of the motors 7 and 8 and its shaft or arbor in relation to its supporting bracket 9 is indicated by a scale X and a cooperating index Y, and the arm 33 is provided with graduations Z adjacent the guide slot 53 provided with scale markings corresponding to those of the scale X; preferably, both scales X and Z will be marked in terms of degrees indicating the angle of the cutters 14 to the direction of travel of the chains 3; then the operator may readily set the machine to cut a groove at the desired angle by merely adjusting the shafts 19 and 56 so that the readings of the scales X for the two cutters 14 and the reading of the scale Z shall all indicate the selected angle of cut.

Although the crank arm 26, which actuates the link rod 28, carries the pivot 25 in an arc for effecting the transverse stroke, this arcuate path of the pivot 25 deviates only slightly from a straight line so that if the rotation of the rock shaft 27 were at a uniform rate the straight-line motion transmitted to the slide 10 would be approximately uniform. Similarly, the arc through which the crank pin 31ª swings is of limited extent, and the same is true of the pivot 32 at the other end of link 30. The range of movement of the crank arms 31 and 33 is such that neither of them ever swings far from a position approximately at right angles to the link 30. Thus, if the rotation of the rock shaft 34 were strictly uniform, the motion transmitted from it by way of the link 30 and rock shaft 27 would be very nearly uniform, since the obliquity of the link 30 is so slight, even when its pivot 32 is adjusted at a maximum radius on the arm 33, as shown in Figure 2. However, since the motion of the rock shaft 34 is derived from the cams 35 and 36, which are rotated continuously in one direction by the shaft 38, the cams may be designed to compensate for any irregularity which might otherwise arise from the various arcuate movements in the linkage so that the motion finally transmitted to the cutters 14 for shifting them transversely of the direction of feed of the work-piece A is at a substantially uniform rate which insures that the resultant path of the cutters, as traced upon the work-piece A, will be a straight-line path in a direction oblique to the direction of movement of the feed chains 3. The two cams 35 and 36 are both keyed to the shaft 38 and act in unison at all times between the rollers 37 of the follower member 39.

In the particular machine herein illustrated the feed chains 3 are advanced thirty-two inches by each rotation of the shaft 42, and the cam shaft 38 is connected to the shaft 42 by the miter gears 40 and 41 at a one-to-one ratio. Hence, the cycle of motions controlled by the cams on the shaft 38 will be repeated once for each revolution of the shaft 42, and it is therefore convenient to provide lugs 5 on the chain 3 at intervals of thirty-two inches for presenting the work-pieces A in correctly timed relation to the operation of the mechanism controlled by the cam shaft 38. If, for other purposes, the chain 3 is provided with lugs at more frequent intervals, as, for example, for regular tenoning work, or for cutting grooves in line with the direction of feed, like the groove A¹ of the piece A, the lugs which are properly placed to cooperate with the cross-feed mechanism herein described may be distinctively marked, as by painting them in a special color to insure proper placing of the work-pieces in the machine.

As already indicated, the depth of the cuts produced by the cutters 14 may be varied by vertical adjustment of the heads 12, and this may be effected independently of any other adjustment. The mechanism for raising and lowering the heads 12 is similar to that shown in Patent No. 1,711,275, previously mentioned, and includes the coaxially mounted hand wheels 80 and 81 shown in Figure 1, which may be understood as geared to operate vertically extending feed screws, one of which is shown at 82 in Figure 2 engaged with a threaded bracket 83 secured to the back of one of the heads 12. The bifurcated crank arms 26, being splined to the shaft 27, are operative at any position of vertical adjustment thereon, and each of these arms is disposed between upper and lower flanges 84 which extend rigidly from the heads 12 and thus serve to carry the crank arms 26 up or down along the shaft 27 when the heads 12 are vertically adjusted.

Since, for some purposes, it is desirable to throw the cross-feed mechanism out of service, the miter gear 41 is secured to the shaft 42 by the engagement of a clutch collar 60 having a pair of notches 61 and 62 which intermember with cooperating lugs 71 and 72 on the end of the hub 70 of the gear 41. The clutch collar 60 is provided with key-ways 63 for keys 73 which connect the collar to the shaft 42. A set screw 64 in the collar normally engages a detent recess 65 in one of the keys 73 to hold the collar in driving position, but upon release of said screw the collar may be shifted along the shaft far enough to disengage its notches 61 and 62 from the lugs 71 and 72 of the hub 70, and the collar may be fixed temporarily in this position by entering the set screw 64 in a second detent recess 66 on the surface of the key 73. To insure properly timed relation between the shaft 42 and the cross-feed mechanism when the clutch collar 60 is again shifted into driving position, the two notches 60 and 61 are of different widths, being formed as opposite ends of a tapered slot cut across the collar, so that there is only one position at which they can be engaged with the correspondingly dimensioned lugs 71 and 72 of the hub 70, as will be apparent from Figures 7 and 8.

Preferably, in a machine of this type the cutters 14 engage the work, as shown in Figure 10, the active cutting teeth traveling in substantially the same direction as the work itself, as indicated by the arrows on the cutters 14, and adjacent the work-pieces A, A. This produces a "climb cut" effect, which tends to prevent the breaking out of the wood at the end of the cut.

I claim as my invention:

1. In a machine having a frame, means for feeding a work-piece in a straight path across the frame, a slide reciprocably mounted for movement transversely of the path of the work-piece, an arbor support on the slide and a cutter arbor rotatably mounted thereon with its axis oblique to the direction of travel of the work-piece, a drive shaft for the feeding means, an oscillatory member operated by said drive shaft, connections from said oscillatory member to the slide for moving it bodily during the cutting operation, said connections including a link and means for varying the effective length of said link to adjust the position of the slide and cutter arbor transversely of the path of movement of the work.

2. In a machine having a frame, means for feeding a work-piece in a straight path across the frame, a driving member for said feeding means, an arbor support and a cutter arbor rotatably mounted thereon with its axis oblique to the direction of travel of the work-piece, an oscillatory member operated by the driving member of the feeding means, and connections from said oscillatory member to the arbor support for reciprocating it bodily in a direction transverse to the path of movement of the work, said connections including a link and a crank pin for said link on the oscillatory member, together with means for adjusting said crank pin radially on said member to vary the distance through which the arbor support is reciprocated.

3. A machine having a frame provided with a horizontal portion and an upright standard disposed at one side thereof, means including a drive shaft for feeding a work-piece in a straight path across said horizontal portion, a cutter head secured to said upright standard, a slide horizontally reciprocable on said head in a direction transverse to the path of movement of the work, an arbor support on said slide adjustable thereon about a vertical axis, an arbor rotatably mounted on said support on a horizontal axis extending obliquely of the path of work movement, and means for reciprocating said slide in timed relation to the movement of the work comprising a bell crank device supported on a vertical axis with a link connecting one arm of the bell crank to the slide, an oscillatory arm operatively connected to the drive shaft and a link connecting said arm to the bell crank device.

4. A machine having a frame provided with a horizontal portion and an upright standard disposed at one side thereof, means including a drive shaft for feeding a work-piece in a straight path across said horizontal portion, a cutter head secured to said upright standard, a slide horizontally reciprocable on said head in a direction transverse to the path of movement of the work, an arbor support on said slide adjustable thereon about a vertical axis, an arbor rotatably mounted on said support on a horizontal axis extending obliquely of the path of work movement, and means for reciprocating said slide in timed relation to the movement of the work comprising a bell crank device supported on a vertical axis with a link connecting one arm of the bell crank to the slide, an oscillatory arm operatively connected to the drive shaft and a link connecting said arm to the bell crank device, together with adjusting means operable to vary the effective length of said arm for altering the movement imparted to the slide in accordance with the angular adjustment of the arbor support thereon.

5. A machine having a frame provided with a horizontal portion and an upright standard disposed at one side thereof, means including a drive shaft for feeding a work-piece in a straight path across said horizontal portion, a cutter head secured to said upright standard, a slide horizontally reciprocable on said head in a direction transverse to the path of movement of the work, an arbor support on said slide adjustable thereon about a vertical axis, an arbor rotatably mounted on said support on a horizontal axis extending obliquely of the path of work movement, and means for reciprocating said slide in timed relation to the movement of the work comprising a bell crank device supported on a vertical axis with a link connecting one arm of the bell crank to the slide, an oscillatory arm operatively connected to the drive shaft and a link connecting said arm to the bell crank device, together with adjusting means operable to vary the effective length of said arm for altering the movement imparted to the slide in accordance with the angular adjustment of the arbor support thereon, a graduated scale indicating the angular adjustment of the arbor support and a similarly graduated scale indicating the corresponding adjustments of effective length of the oscillatory arm to insure a straight cut in the work-piece oblique to its direction of travel.

6. A machine having a frame provided with a horizontal portion and an upright standard disposed at one side thereof, means including a drive shaft for feeding a work-piece in a straight path across said horizontal portion, a cutter head with means for adjusting it vertically on said upright standard, a slide horizontally reciprocable on said head in a direction transverse to the path of movement of the work, an arbor support on said slide adjustable thereon about a vertical axis, an arbor rotatably mounted on said support on a horizontal axis extending obliquely of the path of work movement, and means for reciprocating said slide in timed relation to the movement of the work comprising a vertically disposed rock shaft journaled on the standard, a bell crank device splined on said shaft but adjustable along it in response to vertical adjustment of the slide, a link connecting one arm of the bell crank to the slide, an oscillatory arm operatively connected to the drive shaft and a link connecting said arm to the bell crank device.

7. A machine having a frame provided with a horizontal portion and an upright standard disposed at one side thereof, means for feeding a work-piece in a straight path across said horizontal portion, a pair of cutter heads secured one above the other to said upright standard, a slide horizontally reciprocable on each of said heads in a direction transverse to the path of movement of the work, an arbor support on each slide adjustable thereon about a vertical axis, a pair of arbors rotatably mounted on said supports respectively on horizontal axes extending obliquely of the path of work movement with cutters on said arbors positioned to operate upon the upper and under faces of the work respectively, and means for reciprocating said slides in unison and in timed relation to the feeding movement of the work, said means comprising a bell crank device journaled on the frame on a vertical axis with links connecting said bell crank device to the slides respectively, an oscillatory arm operatively connected to the drive shaft and a link connecting said arm to the bell crank device.

8. A machine having a frame provided with a horizontal portion and an upright standard disposed at one side thereof, means including a drive shaft for feeding a work-piece in a straight path across said horizontal portion, a slide horizontally reciprocable on said standard in a direction transverse to the path of movement of the work, an arbor support on said slide adjustable thereon about a vertical axis, a cutter arbor rotatably mounted on said support on a horizontal axis extending obliquely of the path of work movement, and means for reciprocating said slide in timed relation to the movement of the work comprising a linkage operatively connecting the slide with said drive shaft and including a positive rotary clutch device of two parts separable in axial direction and having mutually engageable features formed to interlock at a single position of rotative adjustment of said parts with respect to each other to permit operation of the machine without reciprocation of said slide upon disengagement of the clutch and to insure correct timing of the slide movement when the clutch is restored to engaged condition.

9. In a machine having a frame, with means for feeding a work-piece in a straight path across the frame, a cutter head carried by the frame, a slide reciprocable on said head in a direction transverse to the path of movement of the work, an arbor support and an arbor rotatably mounted on said support, means for adjusting said support on the slide about an axis for positioning the axis of the arbor obliquely with respect to the direction of travel of the work-piece, and means for reciprocating the slide in timed relation to the movement of the work during the cutting operation including an oscillatory mechanism provided with adjusting means operable to vary the effective stroke of said mechanism, together with a graduated scale indicating the angular adjustment of the arbor support and a similarly graduate dscale indicating the corresponding adjustment of stroke of the oscillatory mechanism.

10. In a machine having a frame, means for feeding a work piece in a straight path across the frame, a slide reciprocably mounted for movement transversely of the path of the work piece, an arbor support on the slide and a cutter arbor rotatably mounted thereon with its axis oblique to the direction of travel of the work piece and oblique to the direction of reciprocation of the slide, a driving member for the feeding means, an oscillatory member operated by said driving member, and linkage pivotally connected to said slide and to said oscillatory member for moving the slide and the cutter arbor bodily during the cutting operation.

11. In a machine having a frame, means for feeding a work piece in a straight path across the frame, a slide reciprocably mounted for movement transversely of the path of the work piece, an arbor support on the slide and a cutter arbor rotatably mounted thereon with its axis oblique to the direction of travel of the work piece, a rotary cam actuated in synchronism with the work feeding means, an oscillatory member having a follower engaging the cam to oscillate said member, and pivotally connected linkage transmitting motion from said oscillatory member to the slide, said rotary cam having a contour which produces movement of the slide at a substantially uniform rate in relation to the work feeding movement during the cutting operation.

12. In a machine having a frame, means for feeding a work piece in a straight path across the frame, a slide reciprocably mounted for movement transversely of the path of the work piece, an arbor support on the slide and a cutter arbor rotatably mounted thereon with its axis oblique to the direction of travel of the work piece, a rotary cam actuated in synchronism with the work feeding means, an oscillatory member having a follower engaging the cam to oscillate said member, and pivotally connected linkage including a rockable member by which motion is transmitted from said oscillatory member to reciprocate the slide and the cutter arbor carried thereby, said rotary cam having a contour which produces movement of the slide at a substantially uniform rate during the cutting operation.

13. A machine having a frame provided with a horizontal portion and an upright standard disposed at one side thereof, means including a drive shaft for feeding a work piece in a straight path across said horizontal portion, a slide horizontally reciprocable on said standard in a direction transverse to the path of movement of the work, an arbor support on said slide adjustable thereon about a vertical axis, an arbor rotatably mounted on said support on a horizontal axis extending obliquely of the path of work movement, and means for reciprocating said slide in timed relation to the movement of the work comprising a rotary cam actuated in synchronism with said drive shaft, a bell crank device supported on a vertical axis with a link connecting one arm of the bell crank to the slide, an oscillatory arm having a follower engaging the said cam for oscillation of said arm by movement of the drive shaft, and a link connecting said arm to the bell crank device, said rotary cam having a contour which compensates for arcuate movements of the oscillatory arm and the bell crank to produce movement of the slide at a substantially uniform rate during the cutting operation.

JUDSON H. MANSFIELD.